United States Patent
Alecu

(10) Patent No.: US 11,994,080 B2
(45) Date of Patent: May 28, 2024

(54) HEATING SYSTEM FOR AIRCRAFT ENGINE LIQUID DISTRIBUTION SYSTEM

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 162 days.

(21) Appl. No.: 17/668,576

(22) Filed: Feb. 10, 2022

(65) Prior Publication Data

US 2023/0250771 A1  Aug. 10, 2023

(51) Int. Cl.
*F02D 41/06* (2006.01)
*F02C 7/06* (2006.01)

(52) U.S. Cl.
CPC ............ *F02D 41/064* (2013.01); *F02C 7/06* (2013.01); *F05D 2220/323* (2013.01); *F05D 2260/98* (2013.01); *F05D 2270/303* (2013.01); *F05D 2270/44* (2013.01)

(58) Field of Classification Search
CPC ...... F02D 41/64; F02C 7/06; F05D 2220/323; F05D 2260/98; F05D 2270/303; F05D 2270/44; F01D 17/08; F01D 19/02; F01D 25/10; F01D 25/12
See application file for complete search history.

(56) References Cited

U.S. PATENT DOCUMENTS

| | | | | |
|---|---|---|---|---|
| 2,664,274 A | * | 12/1953 | Worn | F28F 13/10 165/84 |
| 2,796,735 A | * | 6/1957 | Bodine, Jr. | F02K 7/04 60/39.77 |
| 4,398,398 A | * | 8/1983 | Wheatley | F02G 1/043 62/467 |
| 4,722,201 A | * | 2/1988 | Hofler | F25B 9/145 60/516 |
| 8,596,050 B2 | * | 12/2013 | Gerlach | F01N 5/02 181/227 |
| 9,022,726 B2 | * | 5/2015 | Szwedowicz | F01D 5/187 415/115 |
| 9,670,938 B2 | * | 6/2017 | Beliavsky | F25B 9/04 |

(Continued)

FOREIGN PATENT DOCUMENTS

JP  2005274100 A  * 10/2005  ............... F25B 9/14

OTHER PUBLICATIONS

European Search Report dated Apr. 25, 2023 for corresponding application No. 23155877.6.

*Primary Examiner* — Michael A Riegelman
(74) *Attorney, Agent, or Firm* — NORTON ROSE FULBRIGHT CANADA LLP

(57) ABSTRACT

A heating system for heating a component in a liquid distribution system of an aircraft engine. The liquid distribution system feeds a liquid to the component. The heating system includes an acoustic generator disposed in communication with the component via a liquid passage of the liquid distribution system. The liquid passage defines a length between the acoustic generator and the component. The acoustic generator generates a resonant frequency selected as a function of the length of the liquid passage to generate a standing wave in the liquid within the liquid passage. The standing wave transmitting energy to the component to heat the component.

16 Claims, 3 Drawing Sheets

(56) References Cited

U.S. PATENT DOCUMENTS

| | | | | |
|---|---|---|---|---|
| 9,982,601 | B2* | 5/2018 | Heims | F01D 25/18 |
| 10,677,541 | B2* | 6/2020 | Cukurel | F28F 13/10 |
| 2011/0004390 | A1* | 1/2011 | Nomura | F02C 9/34 |
| | | | | 701/100 |
| 2011/0318191 | A1* | 12/2011 | Szwedowicz | F01D 5/187 |
| | | | | 165/104.11 |
| 2013/0042600 | A1* | 2/2013 | Gerlach | F01N 1/023 |
| | | | | 60/322 |
| 2015/0152886 | A1* | 6/2015 | Beliavsky | F25B 9/04 |
| | | | | 417/53 |
| 2016/0348582 | A1* | 12/2016 | Heims | F01M 1/16 |
| 2017/0064415 | A1* | 3/2017 | Berkcan | H04Q 9/00 |
| 2019/0186287 | A1* | 6/2019 | Lowery | H05H 1/46 |
| 2020/0255154 | A1* | 8/2020 | Bolzmacher | H02N 2/026 |
| 2023/0250771 | A1* | 8/2023 | Alecu | F01D 17/08 |
| | | | | 60/39.08 |

* cited by examiner

HEATING SYSTEM FOR AIRCRAFT ENGINE LIQUID DISTRIBUTION SYSTEM

TECHNICAL FIELD

The disclosure relates generally to aircraft engines and, more particularly, to liquid distribution systems in aircraft engines.

BACKGROUND

Typical gas turbine engines include oil systems which provide oil to various parts of the engine for lubrication, cooling or other uses. Under certain operating conditions, for instance when starting an engine in cold environmental conditions (i.e. a "cold start"), there may be a delay in delivering the oil to various components in the engine due to, for instance, the viscosity of the oil. This issue may be exacerbated in hybrid-electric engines and/or other engine types that use oils having higher viscosities at low temperature.

SUMMARY

In one aspect, there is provided a heating system for heating a component in a liquid distribution system of an aircraft engine, the liquid distribution system feeding a liquid to the component, the heating system comprising: an acoustic generator disposed in communication with the component via a liquid passage of the liquid distribution system, the liquid passage defining a length between the acoustic generator and the component, the acoustic generator generating a resonant frequency selected as a function of the length of the liquid passage to generate a standing wave in the liquid within the liquid passage, the standing wave transmitting energy to the component to heat the component.

In another aspect, there is provided a liquid distribution system for an aircraft engine, comprising: a storage tank for storing a liquid for the liquid distribution system; passages fluidly coupled to the storage tank, at least one of the passages having a component disposed in the at least one of the passages; a pump distributing the liquid throughout the liquid distribution system; and an acoustic generator disposed in the liquid distribution system and fluidly coupled to the component via the at least one of the passages, the at least one of the passages defining a length between the acoustic generator and the component, the acoustic generator generating a resonant frequency selected as a function of the length of the at least one of the passages to generate a standing wave in the liquid within the at least one of the passages, the standing wave transmitting energy to the component to heat the component.

In a further aspect, there is provided a method for heating a component in a liquid distribution system of an aircraft engine, the component disposed in a passage of the liquid distribution system, the method comprising: determining a resonant frequency of the passage based on a length of the passage defined between an acoustic generator disposed in the passage and the component; and generating, at the acoustic generator, a standing wave in the passage based on the resonant frequency to transmit energy to the component to thereby heat the component.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
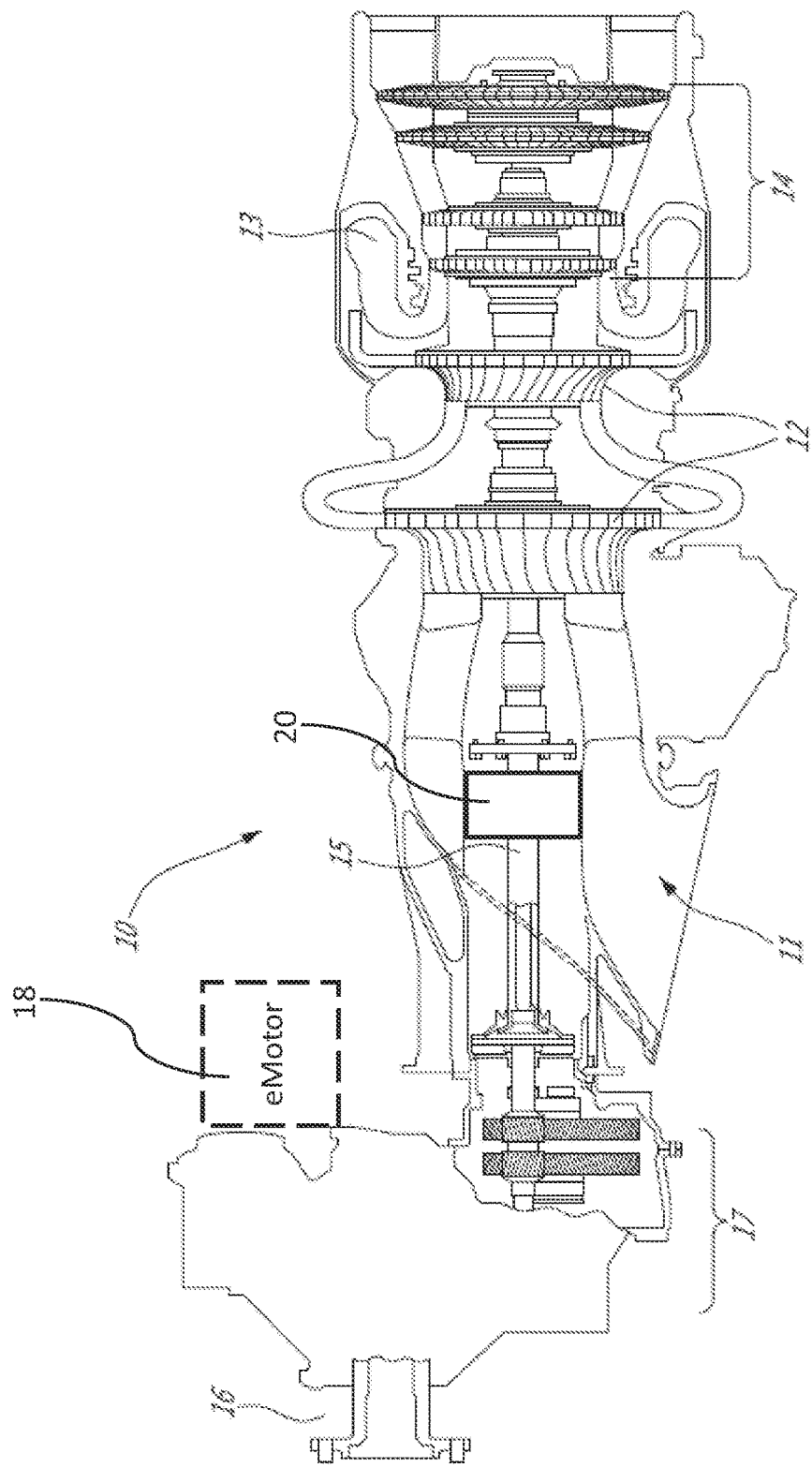
FIG. 1 is a schematic cross sectional view of a gas turbine engine.

FIG. 1 illustrates a gas turbine engine 10 of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The gas turbine engine 10 of FIG. 1 is a turboprop engine, and therefore includes a power output shaft 15 connected to and driven by one or more of the turbines from the turbine section 14 to transmit a driving force to a propeller of the aircraft via a reduction gearbox 17 driving a propeller output flange 16. While an airborne turboprop engine 10 is shown in FIG. 1, it is to be understood that the present disclose equally applies to other types of gas turbine engines, including for example turboshaft engines and non-airborne applications. In addition, the engine 10 may be provided with one or more additional sources of propulsion, for instance eMotor 18 that is powered by one or more additional batteries (not shown). Engine 10 may thus be referred to as a hybrid engine. Other additional sources of propulsion may be contemplated as well. The present disclosure may also be applicable to conventional, i.e. non-hybrid, gas turbine engines.

Figure 2:
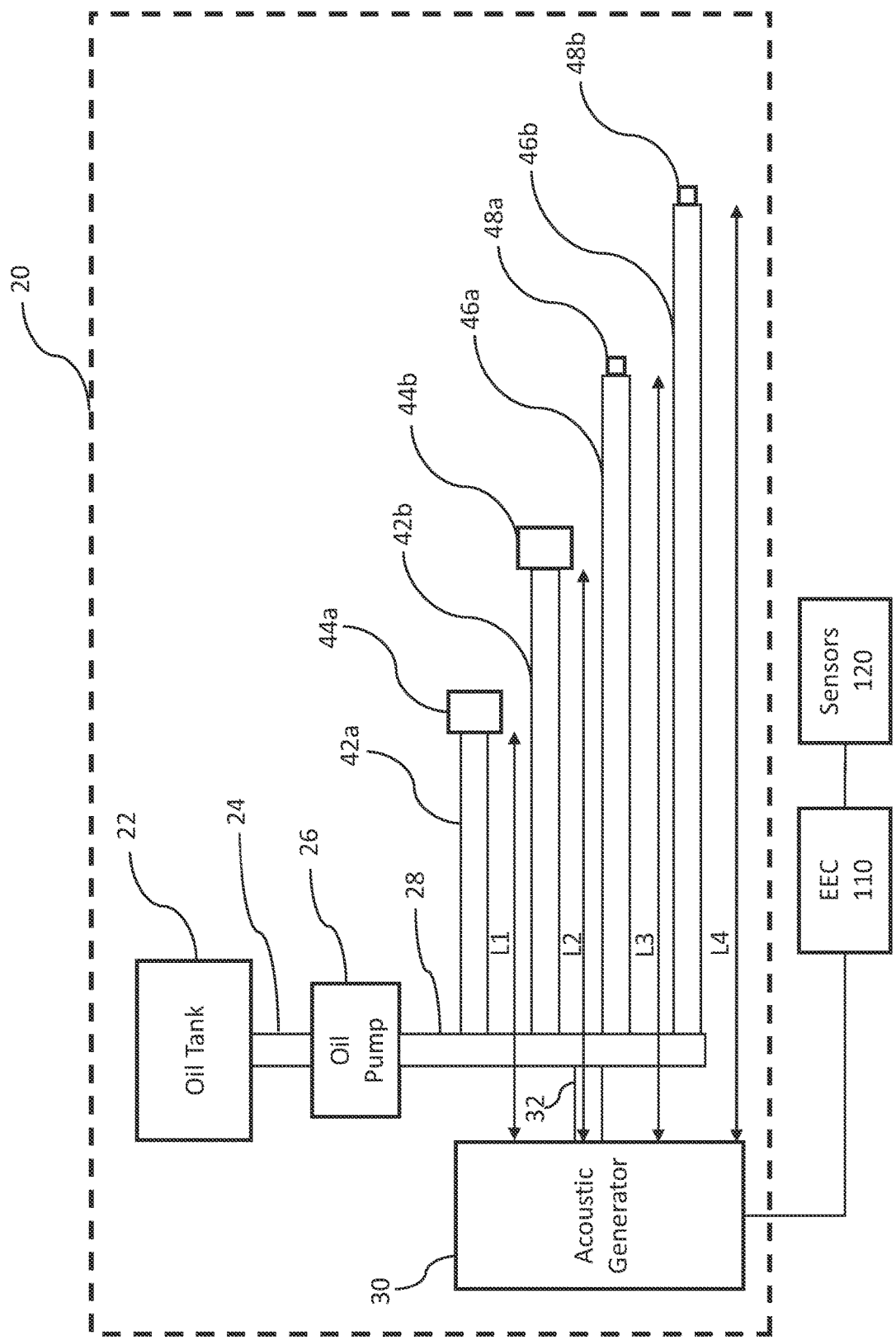
FIG. 2 is a schematic of an example liquid distribution system for an engine.

Referring additionally to FIG. 2, the engine 10 includes a liquid distribution system 20. In the shown embodiment, liquid distribution system 20 circulates oil to provide lubrication and cooling to various components of the engine 10 and may thus be referred to as an oil system 20 or oil distribution system 20. In other embodiments, liquid distribution system 20 may be configured for distributing other liquids within the engine 10, such as engine fuel. In the shown embodiment, oil system 20 includes one or more oil tanks 22 (illustratively one oil tank 22) for storing oil that may be used, for example, for lubrication and cooling. In other embodiments, other liquids stored in other such storage tanks and distributed through various liquid passages may be contemplated. The oil system 20 schematically illustrated in FIG. 1 does not represent a specific quantity, structure and/or location in the engine 10. In the embodiment depicted in FIG. 2, a plurality of oil passages 24, 28, 42, 46 interconnect the oil tank(s) 22 with other components of the engine, and one or more oil pumps 26 circulate oil throughout the oil system 20. While not shown in FIG. 2, it is understood that other oil passages may be present to recirculate oil back to the oil tank 22 and/or oil pump 26. In other cases, for instance where system 20 distributes engine fuel, no such recirculation may occur.

Under certain operating conditions, such as but not limited to cold engine starts or other conditions involving low ambient temperatures, certain engine components may be susceptible to degradation, damage or other undesirable consequences due to, for instance, the delayed supply of oil as a result of low temperatures and the resulting high viscosity of the oil. While various engine components 44 throughout the oil system 20 may be less susceptible to such operating conditions, other engine components 48, for instance those which contain narrow or restrictive sections, may be more susceptible to such operating conditions. As such, the oil system 20 includes an acoustic generator 30 configured for generating a standing wave in one or more oil passages 46 to transmit energy to said susceptible components 48 and thus heat said susceptible components 48, as will be discussed in further detail below. Acoustic generator 30, oil passages 46 and susceptible components 48 may thereby be referred to as a heating system.

In the embodiment shown in FIG. 2, the oil tank 22 is fluidly coupled to the oil pump 26 via oil passage 24. The oil pump 26 supplies oil to the various engine components 44, 48 via main oil passage 28, which then branches into various oil passages 42 and 46 leading to various engine components 44, 48. The oil system 20 is a closed loop system, as oil is recirculated throughout (not shown in FIG. 2). Oil system 20 further includes acoustic generator 30. As shown in FIG. 2, the acoustic generator 30 is positioned at a dead-ended port in the oil system 20 and fluidly coupled to the engine components 44, 48 via a finite-length adaptor 32 fluidly coupled to main oil passage 28. In other embodiments, the acoustic generator 30 may be positioned elsewhere, such as between the oil pump 26 and the various engine components 44, 48 in the oil system 20. As will be discussed in further detail below, each oil passage 42, 46 may be associated with a unique or distinct length L representing an effective length between the acoustic generator 30 and each engine component 44, 48 that will correspond with a signal emitted by the acoustic generator 30.

In the embodiment shown in FIG. 2, the oil system 20 includes two engine components 44a, 44b that may not require heating via the acoustic generator 30, and two engine components 48a, 48b that may require heating via the acoustic generator 30 under certain operating conditions. These respective numbers of components are for illustrative purposes only, and it is understood that oil system 20 may include more or less of each category of component. Illustratively, components 44a, 44b are respectively disposed at the distal ends of oil passages 42a, 42b having respective lengths L1, L2 from the acoustic generator 30, while components 48a, 48b are respectively disposed at the distal ends of oil passages 46a, 46b having respective lengths L3, L4 from the acoustic generator 30. While FIG. 2 illustratively shows lengths L1-L4 represented as straight lines, it is understood that said lengths represent the effective lengths from the acoustic generator 30, through adaptor 32 and main oil passage 28 to each engine component 44, 48 via respective oil passage 42, 46. The acoustic generator 30 may thus be considered to be disposed at the proximal end of the adaptor 32, with the distal end of the adaptor 32 fluidly coupled to the main oil passage 28. Similarly, each of the passages 42a, 42b, 46a, 46b may have its proximal end defined at a junction with the main oil passage 28, with the various engine components 44, 48 positioned at their distal ends. In other embodiments, the components 48a, 48b may be disposed at other locations within passages 46a, 46b between proximal and distal ends. In the present embodiment, distances L1, L2, L3 and L4 are each different from one another. In other cases, certain components of a same category (i.e., susceptible or non-susceptible) may be disposed at a same length L from the acoustic generator 30.

Various components 48 may be susceptible to damage or other types of failure in case of delayed oil supply, for instance due to low temperature-based operating conditions. For instance, oil nozzles, oil flow restrictors, and oil valves may have low flow rates due to their narrow passages compared to other passages in the oil system 20, and may thus be susceptible to various types of failure due to a delay in oil supply. Similar components in the fuel system (e.g. fuel nozzle, fuel restrictors, etc.) may also be targeted for heating as described herein. Additionally, a journal main engine bearing, which may be used in hybrid-powered gas turbine engines, may be susceptible to damage by a delay in oil supply during a cold engine start or similar low-temperature-based operating conditions. Other like susceptible components may be contemplated as well.

The acoustic generator 30 may be, for instance, a piezo-ceramic, electromagnetic, magneto-strictive, thermo-acoustic, vapor cycle, pneumatic, hydraulic, or mechanic (for instance, a small pump interacting with a Helmholtz resonator) signal generator. Other types of acoustic generators 30 may be contemplated as well. The acoustic generator 30 is configured for generating one or more standing waves in one or more oil passages 46 to heat the one or more components 48 susceptible to damage under certain operating conditions. To generate the one or more standing waves, the acoustic generator 30 may generate one or more harmonic signals that is/are tuned to the first resonant frequency (or other resonant frequencies) of each of the oil passages 46 leading to a susceptible component 48. Oil passages 46 may thus be referred to as active passages 46 or tuned passages 46, as the standing wave(s) is/are generated as a function of a resonant frequency of the passage(s) 46. Similarly, oil passages 42 (leading to non-susceptible or less susceptible components 44) may be referred to as inactive or de-tuned passages 42. In some cases, the acoustic generator 30 may be configured for outputting a multi-frequency signal, such that multiple standing waves (i.e. the initial standing wave and one or more additional standing waves) are generated, namely wherein a distinct standing wave is generated in each active passage 46. As will be discussed in further detail below, the multi-frequency signal may be tuned to produce a standing wave in each active passage 46 without producing a standing wave in the inactive passages 42, for instance due differences in respective lengths L of each passage 42, 46.

An exemplary process for generating a standing wave in an active passage 46, for instance passage 46a, based on the finite passage length L3 between the acoustic generator 30 and the component 48a at the distal end of passage 46a, will now be described. This process may be performed by a control system, for instance a controller 110 operatively connected to the acoustic generator 30, as will be discussed below. The controller 110 may be an existing engine controller, or may be an additional controller dedicated to and integrated with the acoustic generator 30. First, the first harmonic (also referred to as the fundamental frequency) of the passage 46a may be estimated based on the speed of the wave in the medium (i.e., the speed of the signal generated by acoustic generator 30 travelling through oil) and the length L3 associated with the passage 46a. As passage 46a may be considered a finite length passage or pipe having different end conditions, such an estimate may be carried out by the formula:

$$f = \frac{c}{4L}$$

In the above formula, f represents the fundamental frequency, c represents the speed of the wave in the medium, and L represents the length of the pipe. Other frequencies to establish the standing wave, for instance higher harmonics, may be contemplated as well. In some embodiments, the passage 46a may be considered a finite length pipe having same end conditions (resembling a closed-ended pipe), in which case the first resonant frequency may be estimated by the formula:

$$f = \frac{c}{2L}$$

After an estimate for the fundamental frequency of passage 46a has been determined, the acoustic generator 30 may conduct a frequency sweeping process to reach the actual fundamental frequency of passage 46a and thus generate a standing wave. For instance, the acoustic generator may begin by outputting a signal that is slightly below the estimated fundamental frequency of passage 46a, and then begin increasing the frequency. Simultaneously, the power consumption of the acoustic generator 30 may be monitored. When the power consumption of the acoustic generator 30 reaches a minimum value, the outputted signal is assumed to be at the actual fundamental frequency of passage 46a. The frequency sweeping process may be continuous, i.e., a range for the fundamental frequency of passage 46a may be continuously narrowed down until eventually converging at the exact resonance. In some embodiments, the process may continue until the frequency of the generated signal is within 1 Hz of the resonant frequency of the passage 46a. Other thresholds may be contemplated as well. To aid in the frequency sweeping process, the acoustic generator 30 may additionally implement active feedback control by comparing a measured current to a reference current.

In embodiments where more that one active passage 46 is present, for instance active passages 46a and 46b shown in FIG. 2, the frequency sweeping process may be realized simultaneously for all target resonances based on the respective lengths L of each passage 46. As discussed above, the de-tuned or inactive passages 42, illustratively passages 42a, 42b may not require heating at their distal ends. As such, since their respective lengths L1, L2 differ from the lengths L3, L4 associated with the tuned passages 46a, 46b, any signals entering passages 42a, 42b will not be at the fundamental frequencies of these passages, and a standing wave will not be generated.

The acoustic generator 30 is configured for heating one or more susceptible components 48 (illustratively components 48a, 48b) by generating a standing wave in each tuned or active passage 46 (illustratively passages 46a, 46b). The standing waves may propagate energy through the oil in the passages 46a, 46b without losses to heat the components 48a, 48b. Each standing wave may produces very large pressure ripples at the end of each active passage 46 which are applied to the component 48 at the distal end thereof. The oscillating pressure may generate a discontinuous flow at the component 48, causing a cavitation bubble to develop at the component 48. The cavitation bubble then collapses and the process repeats over the next ripple. The collapsing of the cavitation bubbles and the intense viscous shear created therefrom may result in rapid heating of the component 48. As the component 48 is rapidly heated, the flow of oil at or though the component 48 may increase, minimizing the risk of damage to the component 48. In an exemplary embodiment, the component 48 is an oil nozzle, and the local heat generation may exceed 3 BTU/lb of oil flowing through the nozzle. In some embodiments, the temperature of component 48, for instance the oil nozzle, may rise 40 F to 100 F above the temperature of the upstream oil flowing through passage 46. As the acoustic generator 30 is configured for generating standing waves in one or more of the active passages 46, energy may be transferred to the distal ends of the passages 46 (to the components 48) with minimal effective displacement of the liquid within the passages 46, thus reducing the amount of energy required to be expended.

As discussed above, the system 20 may include a control system that includes a controller 110, for instance an Electronic Engine Controller (EEC) (as shown in FIG. 2) or a Full Authority Digital Engine Control (FADEC). The EEC 110 may be configured to control the operation of the acoustic generator 30 based on, for instance, an operational state of the engine 10 and/or one or more temperature readings obtained from one or more sensors 120 disposed throughout the engine 10. Such temperature readings may include, for instance, an ambient air temperature, various core temperatures, and various oil temperatures throughout the system 20. Various temperature thresholds may be inputted into the EEC 110 to determine when a corresponding viscosity of the oil is high enough that certain components 48 may be susceptible to damage. The EEC 110 may then engage the acoustic generator 30 to generate one or more standing waves in the tuned passages 46 to heat the components 48. The EEC 110 may engage the acoustic generator 30 anytime the ambient temperature is below a predetermined value and the engine 10 has been inoperative for a predetermined amount of time, conditions indicative of a cold start. Other means for determining when to engage the acoustic generator 30 may be contemplated as well. In some cases, a human operator may partially or fully control operations of the acoustic generator 30.

The sensor(s) 120 may be any suitable sensor(s) for measuring temperature. While the sensor(s) 120 are shown separate from system 20, this is for example purposes only. The sensor(s) 120, for instance temperature sensors, may be integrated into the system 20 at any suitable position of the oil system 20. The sensor(s) 120 may be part of the system 20 and/or may be separate from the system 20. Other sensors 120, for instance oil pressure sensors and flow rate sensors, may be included to assist the EEC 110 in determining when to engage the acoustic generator 30. In an exemplary embodiment, the control system, for instance EEC 110 may engage or disengage the acoustic generator 30 when the one or more temperature sensors detect a temperature below or above a predetermined threshold.

In various embodiments, the acoustic generator 30 is activated prior to initiating the engine 10 during a cold start procedure and for a certain period of time afterwards until various operating conditions of the engine 10 no longer necessitate the use of the acoustic generator 30. The acoustic generator 30 may be activated for any other condition deemed appropriate by a higher level system, for instance EEC 110 (or other engine or human operator). In other embodiments, the herein-described acoustic generator 30 may be configured for heating components of other liquid systems of the engine 10 that may, for instance, be susceptible to damage in low temperature conditions.

In various embodiments, system 20 may include other methods and devices for adapting the effective lengths L of the active passages 46 to ensure that the pressure ripples at the ends of the standing waves occur at the intended locations (thus heating the components 48). For instance, the system 20 may include one or more dashpots, tuned Helmholtz resonators, passage stepping diameters, and/or active valves creating non-linearity's. Such means may also be utilized to ensure that a standing wave does not develop in passages 42 or in the main oil passage 28 in the direction of the oil pump 26. In an exemplary embodiment, a step-down orifice may be installed in the main oil pump 28 downstream of the oil pump 26 and upstream of the acoustic generator 30 to prevent a standing wave from developing between the acoustic generator 30 and the oil pump 26. Other means for adapting the effective lengths L of the various passages may be contemplated as well.

Figure 3:
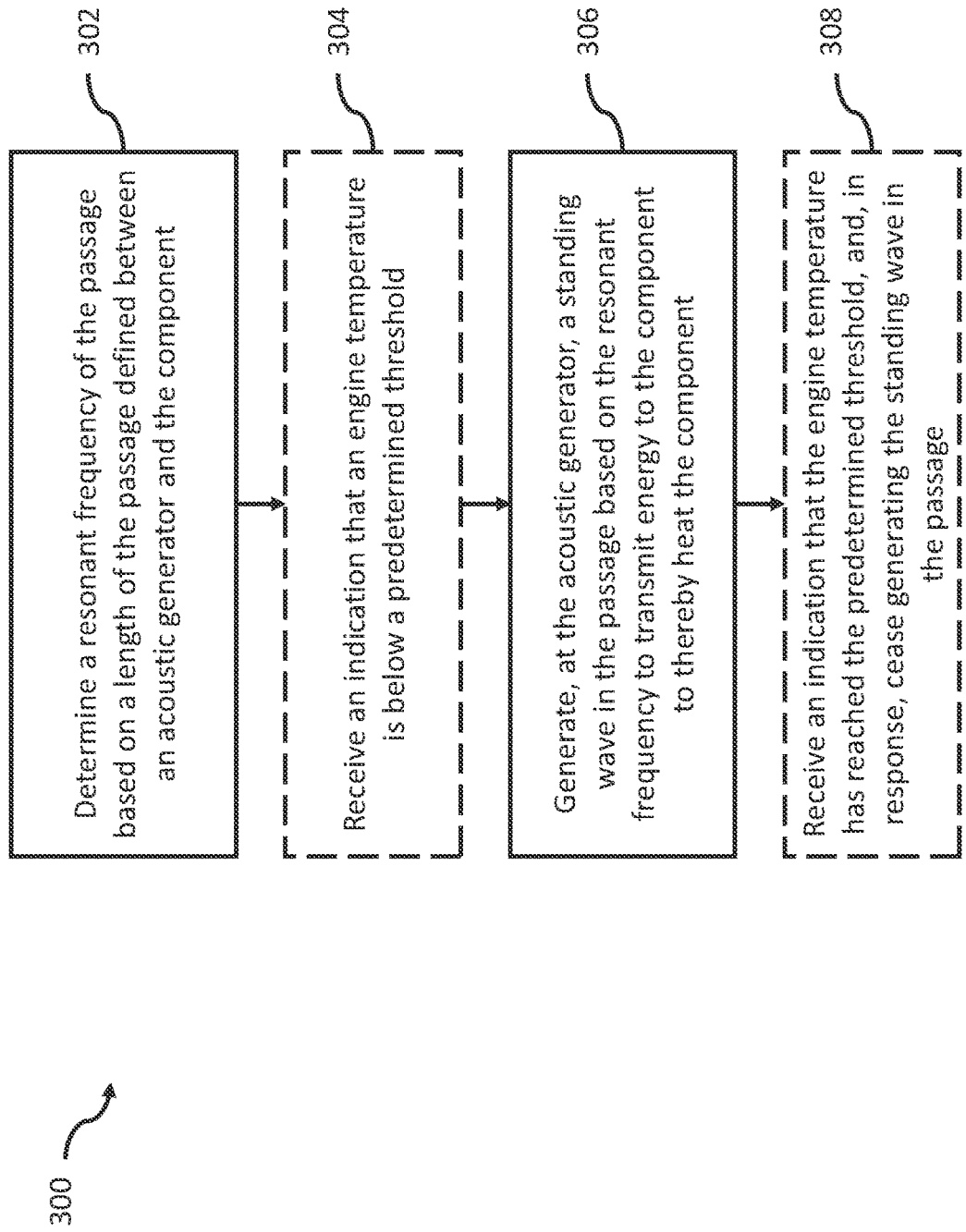
FIG. 3 is a flowchart illustrating an example method for heating components of an engine.

Referring to FIG. 3, an exemplary method 300 for heating a component, for instance component 48a, of an aircraft engine 10, the component 48a disposed at a distal end of a passage 46a in a liquid distribution system, for instance oil system 20. At least some aspects of method 300 may be performed by the EEC 110, another suitable controller, and/or by a human operator.

At step 302, a resonant frequency of the passage 46a is determined based on a length L3 associated with the passage 46a and defined between an acoustic generator 30 and the component 48a.

At optional step 304, an indication may be received that a temperature of the engine, for instance measured by one or more sensors 120, is below a predetermined threshold.

At step 306, a standing wave is generated in the passage 46a by the acoustic generator 30 based on the resonant frequency to transmit energy to the component 48a to thereby heat the component 48a at the distal end of the passage 46a.

At optional step 308, an indication may be received that the temperature of the engine has reached (or exceeded) the predetermined threshold. In response, the acoustic generator 30 is instructed to cease generating the standing wave in the passage 46a.

Method 300 may be further adapted based on the above disclosure. For instance, the first resonant frequency of at least one additional passage 46b may be determined based on a finite length L4 of the at least one additional passage 46b taken between the acoustic generator 30 at a proximal end of the at least one additional passage 46b and at least one additional component 48b at a distal end of the at least one additional passage 46b, wherein the generating the standing wave further includes outputting, at the acoustic generator 30, a multi-frequency signal to produce standing waves in the passage 46a and in the at least one additional passage 46b to heat the component 48a and the at least one additional component 48b.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A heating system for heating a component in a liquid distribution system of an aircraft engine, the liquid distribution system feeding a liquid to the component, the heating system comprising:
   an acoustic generator disposed in communication with the component via a liquid passage of the liquid distribution system, the liquid passage defining a length between the acoustic generator and the component, the acoustic generator generating a resonant frequency selected as a function of the length of the liquid passage to generate a standing wave in the liquid within the liquid passage, the standing wave transmitting energy to the component to heat the component;
   wherein the acoustic generator is fluidly coupled to at least one additional component via at least one additional liquid passage of the liquid distribution system; and
   wherein the acoustic generator generates a multi-frequency signal to generate the standing wave in the liquid passage to heat the component and to generate at least one additional standing wave in the at least one additional liquid passage to heat the at least one additional.

2. The heating system as defined in claim 1, wherein the acoustic generator is one of a piezoceramic, electromagnetic, magneto-strictive, thermo-acoustic, vapor cycle, pneumatic, hydraulic, and mechanic type acoustic generator.

3. The heating system as defined in claim 1, wherein the resonant frequency generated by the acoustic generator is a first resonant frequency of the liquid passage.

4. The heating system as defined in claim 3, wherein the acoustic generator utilizes frequency sweep and active feedback control to tune the first resonant frequency generated by the acoustic generator.

5. The heating system as defined in claim 1, further comprising a control system operatively coupled to the acoustic generator, wherein the acoustic generator is engageable, via the control system, prior to a cold engine start of the aircraft engine.

6. The heating system as defined in claim 1, further comprising one or more temperature sensors disposed in the aircraft engine and a control system operatively coupled to the acoustic generator and the one or more temperature sensors, wherein the acoustic generator is engageable or disengageable, via the control system, when the one or more temperature sensors detect a temperature below or above a predetermined threshold.

7. A liquid distribution system for an aircraft engine, comprising:
   a storage tank for storing a liquid for the liquid distribution system;
   passages fluidly coupled to the storage tank, at least one of the passages having a component disposed in the at least one of the passages;
   a pump distributing the liquid throughout the liquid distribution system; and
   an acoustic generator disposed in the liquid distribution system and fluidly coupled to the component via the at least one of the passages, the at least one of the passages defining a length between the acoustic generator and the component, the acoustic generator generating a resonant frequency selected as a function of the length of the at least one of the passages to generate a standing wave in the liquid within the at least one of the passages, the standing wave transmitting energy to the component to heat the component;
   wherein the acoustic generator generates a multi-frequency signal to generate one or more additional standing waves in an additional one or more of the passages with components disposed in the additional one or more of the passages.

8. The liquid distribution system as defined in claim 7, wherein the liquid distribution system is an oil distribution system and the component is one of an oil nozzle, oil flow restrictor, oil valve or journal bearing.

9. The liquid distribution system as defined in claim 7, wherein the acoustic generator is one of a piezoceramic, electromagnetic, magneto-strictive, thermo-acoustic, vapor cycle, pneumatic, hydraulic, and mechanic type acoustic generator.

10. The liquid system as defined in claim 7, wherein the resonant frequency generated by the acoustic generator is a first resonant frequency of the at least one of the passages.

11. The liquid distribution system as defined in claim 10, wherein the acoustic generator utilizes frequency sweep and active feedback control to tune the first resonant frequency generated by the acoustic generator.

12. The liquid distribution system as defined in claim 7, further comprising a control system operatively coupled to the acoustic generator, wherein the acoustic generator is engageable, via the control system prior to a cold engine start of the aircraft engine.

13. A method for heating a component in a liquid distribution system of an aircraft engine, the component disposed in a passage of the liquid distribution system, the method comprising:
   determining a resonant frequency of the passage based on a length of the passage defined between an acoustic generator disposed in the passage and the component; and
   generating, at the acoustic generator, a standing wave in the passage based on the resonant frequency to transmit energy to the component to thereby heat the component, and sweeping for the resonant frequency based on active feedback control.

14. The method as defined in claim 13, further comprising, prior to generating the standing wave, receiving an indication that an engine temperature is below a predetermined threshold.

15. The method as defined in claim 14, further comprising receiving an indication that the engine temperature has reached a predetermined threshold, and, in response, ceasing the generating the standing wave in the passage.

16. The method as defined in claim 13, further comprising determining a resonant frequency of at least one additional passage based on a length of the at least one additional passage defined between the acoustic generator and at least one additional component disposed in the at least one additional passage, wherein the generating the standing wave further includes generating, at the acoustic generator, a multi-frequency signal based on the resonant frequency of the passage and the resonant frequency of the at least one additional passage to produce standing waves in the passage and in the at least one additional passage to transmit energy to the component and the at least one additional component to thereby heat the component and the at least one additional component.

* * * * *